US006820562B2

United States Patent
Zodnik et al.

(10) Patent No.: US 6,820,562 B2
(45) Date of Patent: Nov. 23, 2004

(54) PLASTIC DESK WITH INTEGRAL COMPUTER

(75) Inventors: Richard Zodnik, San Juan Capistrano, CA (US); Rick Goerner, San Juan Capistrano, CA (US); Charles Pelly, Woodland Hills, CA (US)

(73) Assignee: Accelerated Performance, Inc., San Juan Capistrano, CA (US)

( * ) Notice: Subject to any disclaimer, the term of this patent is extended or adjusted under 35 U.S.C. 154(b) by 311 days.

(21) Appl. No.: 09/998,081

(22) Filed: Nov. 29, 2001

(65) Prior Publication Data

US 2002/0097567 A1 Jul. 25, 2002

Related U.S. Application Data

(60) Provisional application No. 60/250,290, filed on Nov. 29, 2000.

(51) Int. Cl.[7] ............................................. A47B 37/00
(52) U.S. Cl. ............................... 108/50.01; 312/208.1; 312/223.2; 248/917; 361/683
(58) Field of Search ...................... 108/50.01–50.02; 248/917–924; 312/208.1–4, 223.1–3; 361/679–686

(56) References Cited

U.S. PATENT DOCUMENTS

| | | | |
|---|---|---|---|
| 4,562,482 A | | 12/1985 | Brown |
| 4,603,925 A | | 8/1986 | Cuevas-Cumming |
| 4,766,422 A | * | 8/1988 | Wolters et al. ............... 312/198 |
| 5,002,184 A | | 3/1991 | Lloyd |
| 5,108,063 A | | 4/1992 | Koerber, Sr. et al. |
| 5,174,223 A | | 12/1992 | Nagy et al. |
| 5,348,324 A | | 9/1994 | Trotta |
| 5,452,950 A | * | 9/1995 | Crenshaw et al. ....... 312/223.3 |
| 5,530,842 A | | 6/1996 | Abraham et al. |
| 5,548,729 A | | 8/1996 | Akiyoshi et al. |
| 5,818,930 A | | 10/1998 | Mark |
| 5,909,934 A | | 6/1999 | McGraw |
| 5,986,634 A | | 11/1999 | Alioshin et al. |
| 6,005,769 A | * | 12/1999 | Cho ........................... 361/686 |
| 6,009,528 A | | 12/1999 | Teraoka |
| 6,023,563 A | | 2/2000 | Shani |
| 6,044,411 A | | 3/2000 | Berglund |
| 6,128,186 A | | 10/2000 | Feierbach |
| 6,145,126 A | | 11/2000 | Matsukura et al. |
| 6,184,804 B1 | | 2/2001 | Harrison |
| 6,186,076 B1 | * | 2/2001 | Sung ........................ 108/50.02 |
| 6,286,440 B1 | * | 9/2001 | Jyringi ..................... 108/50.01 |
| 6,300,863 B1 | | 10/2001 | Cotichini et al. |
| 6,331,934 B1 | * | 12/2001 | Helot et al. ................. 361/686 |
| 6,347,345 B1 | | 2/2002 | Cheon |
| 6,389,499 B1 | | 5/2002 | Frank et al. |
| 6,400,964 B1 | | 6/2002 | Zicker et al. |
| 6,427,198 B1 | | 7/2002 | Berglund et al. |
| 6,470,387 B1 | | 10/2002 | Fischer |
| 6,480,922 B1 | | 11/2002 | Cunningham et al. |
| 6,526,582 B1 | | 2/2003 | Brodigan |
| 2001/0043290 A1 | | 11/2001 | Yamamoto |

* cited by examiner

Primary Examiner—Tuyen T. Nguyen
(74) Attorney, Agent, or Firm—Irell & Manella LLP

(57) ABSTRACT

A desk that contains an integrated computer. The desk includes a screen and a keyboard that are attached to a frame. The desk may also have a backplane located in a slot of the frame. A portable transporter computer can be plugged into the backplane to couple the transporter with the screen and keyboard. A battery module may also be plugged into the frame to power the transporter, screen and keyboard. When the desk is not in use the battery module can be plugged into a charging station to recharge the batteries of the module.

16 Claims, 7 Drawing Sheets

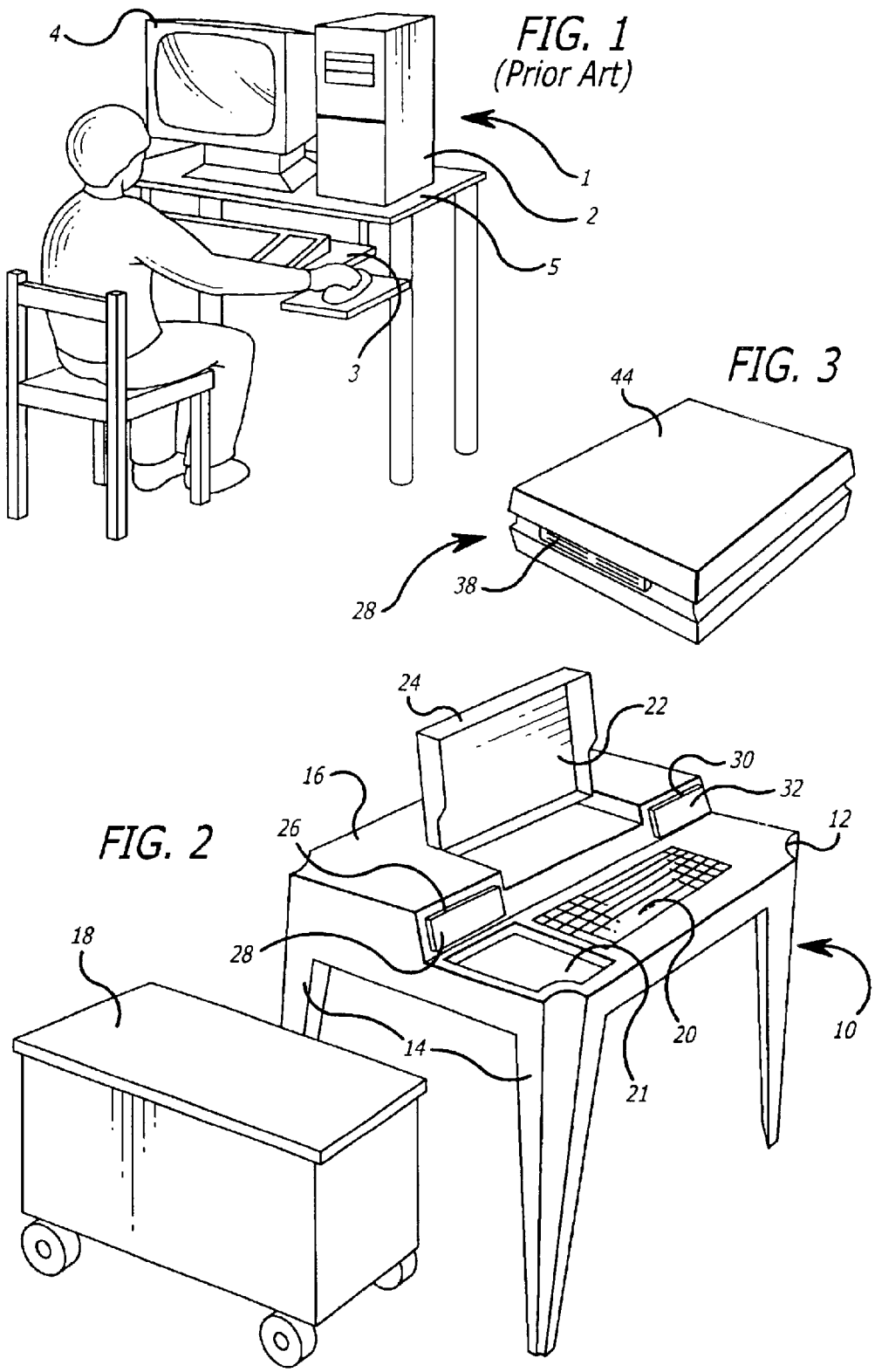

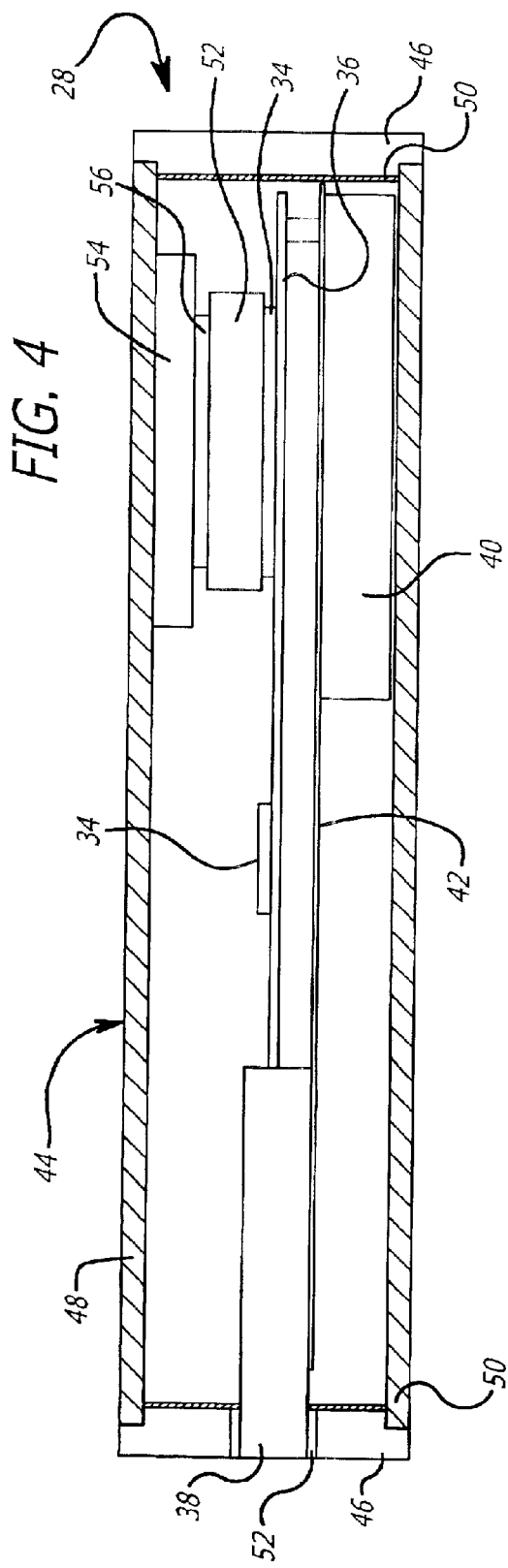
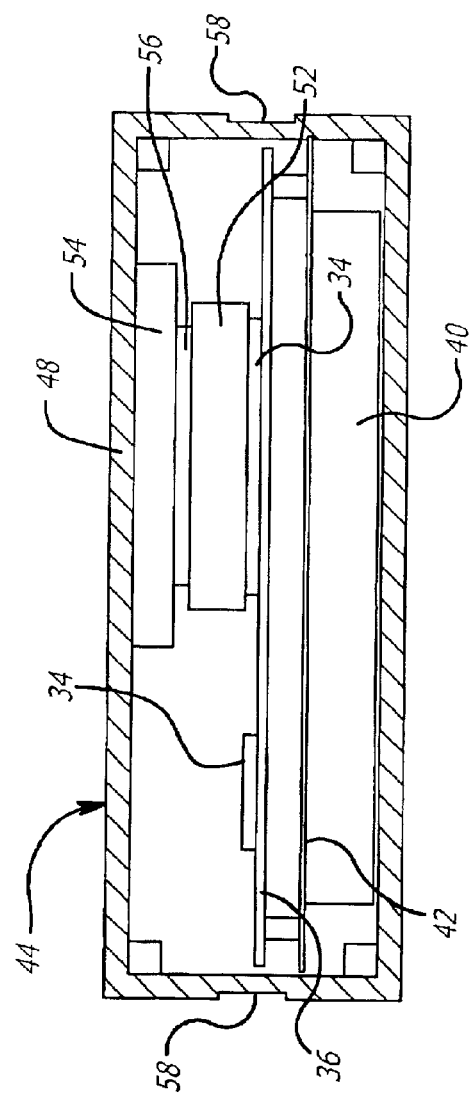
FIG. 4
FIG. 5

PLASTIC DESK WITH INTEGRAL COMPUTER

CROSS-REFERENCE TO RELATED APPLICATIONS

This application is a non-provisional application of a provisional application, Application No. 60/250,290 filed on Nov. 29, 2000.

BACKGROUND OF THE INVENTION

1. Field of the Invention

The present invention relates to a computer integrated into a school desk.

2. Background Information

Given the electronic age there is a desire to provide every student with a computer. Some school districts are even mandating that each student have a computer. Consequently, either the school district or the child's parent(s) must purchase and supply the students with a computer. There are basically two types of commercially available computers, desk tops, or laptops.

FIG. 1 shows a conventional desk top computer 1. The computer 1 includes a "tower" 2 that is coupled to a keyboard 3 and a cathode ray tube ("CRT") monitor 4. The tower 2 contains a microprocessor, memory and other electronic circuits as is known in the art.

The various components of the computer 1 can be placed on a desk 5. Desk top computers 1 can occupy a considerable amount of space. To provide additional desk space the tower 2 may be placed below the computer. Unfortunately, this approach reduces the leg room under the desk.

The tower 2, keyboard 3 and monitor 4 are coupled together by cables (not shown) that must be connected when assembling the system. The cables are unsightly and require a certain level of skill to connect. A skill that a child may not possess.

Instead of desk tops, the students may be provided with laptop computers. Laptop computers are portable and significantly smaller than desk top computers. Unfortunately, the portability of laptops make such machines more susceptible to theft and damage.

Every computer in the classroom must have access to electrical power. Consequently, to fully equip a classroom with computers, power outlets must be placed next to the computers, or power cables must be routed across the classroom floor. Retrofitting classrooms to have multiple power outlets is an expensive and time consuming task. Routing power cables across the floor is unsightly and creates safety issues for the students.

It is generally desirable to interconnect the computers of a classroom. Such an arrangement would allow the teacher to provide simultaneous electronic instructions. Interconnecting the computers would again require adjacent network outlets or running cables across the room.

BRIEF SUMMARY OF THE INVENTION

A desk that has a keyboard and a screen that are attached to a desk frame. The desk further includes a transporter computer that can be plugged into the frame and coupled to the keyboard and screen.

BRIEF DESCRIPTION OF THE DRAWINGS

FIG. 1 is a perspective view of a computer on a desk of the prior art;

FIG. 2 is a perspective view of a desk and a cart;

FIG. 3 is a perspective view of a transporter computer;

FIG. 4 is a side sectional view of the transporter;

FIG. 5 is an end sectional view of the transporter;

DETAILED DESCRIPTION

Figure 6:
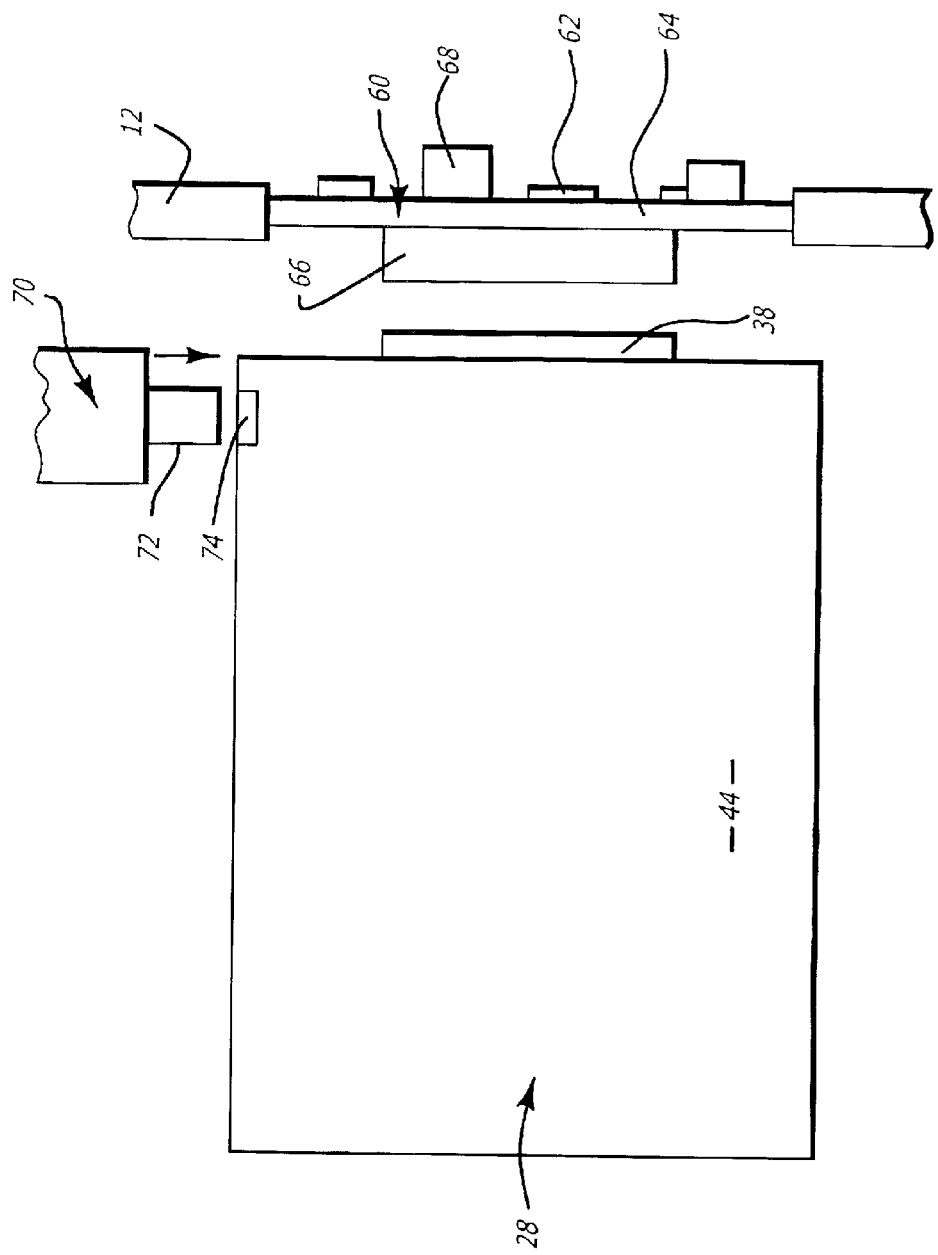
FIG. 6 is a top sectional view showing the transporter plugged into a backplane.

Disclosed is a desk that contains an integrated computer. The desk includes a screen and a keyboard that are attached to a frame. The desk may also have a backplane located in a slot of the frame. A portable transporter computer can be plugged into the backplane to couple the transporter with the screen and keyboard. A battery module may also be plugged into the frame to power the transporter, screen and keyboard. When the desk is not in use the battery module can be plugged into a charging station to recharge the batteries of the module. Providing a pluggable, portable battery module allows the computer to operate without having to run power cables to the desk.

The desks of a classroom may be connected to each other and a teachers podium through a network. The teachers podium may have two screens, one screen to disseminate classroom instructions and another screen to monitor the screens of the students. The network may include a wireless hub, a router and a server. The students may pull their transporter computer out of the desk frame and plug the transporter into a different desk. The transporter is coupled to the backplane of the desk frame. The transporter computer reads a backplane identification that is unique to the desk. The transporter may then send a command to reconfigure a relational database in the server so that all network communications are routed to the student at their new desk.

Referring to the drawings more particularly by reference numbers, FIG. 2 shows a desk 10. The desk 10 includes a frame 12 that has a plurality of legs 14 attached to a table top 16. The table top 16 and legs 14 are preferably constructed from a molded plastic material. Molded plastic material is preferable because it is light, durable and economical. It is desirable to construct the desk 10 so that a number of desks can be stacked onto a mobile cart 18. This allows the desks 10 to be more readily transported and stored.

A keyboard 20 may be attached to the table top 16 of the frame 12. The keyboard 20 may be attached by screws or other fasteners that secure the board 20 to the frame 12 but allow replacement of the part. The keyboard 20 may include an integrated "mouse" (not shown). The table top 16 may include a recessed area 21 for pencils, etc.

A screen 22 may be attached to a cover 24 of the frame 12. The cover 24 can rotate down onto the table top 16 to increase the working surface of the desk 10 when the screen 22 is not being used by the student. The screen 22 can be attached with fasteners (not shown) that allow the part to be replaced. The screen 22 is preferably a flat panel device that minimizes the profile of the desk 10.

The frame 12 includes a slot 26 that can receive a portable transporter computer 28 and a slot 30 that can receive a portable battery module 32. The underside of the frame 12 may contain the appropriate connectors, wires, etc. so that the computer 28 is coupled to the screen 22 and keyboard 20, and the devices 20, 22 and 28 are powered by the battery module 32. The battery module 32 is preferably constructed to operate the desk for a full day school session. The portable battery module 32 eliminates the need for placing electrical outlets next to the desk 10 or routing power cables across the classroom.

FIGS. 3, 4 and 5 show an embodiment of a transporter computer 28. The transporter 28 may include a plurality of integrated circuit packages 34 mounted to a printed circuit board 36. The packages 34 contain integrated circuits (not shown). For example, the integrated circuits may include a microprocessor, volatile memory, a bus chip set, etc. and other circuits required to create an operational computer.

An electrical connector 38 may be mounted to the printed circuit board 36 and connected to the integrated circuits. The connector 38 can be plugged into a mating connector (not shown) of the desk frame 12 to couple the transporter 28 to the screen 22, keyboard 20 and battery module 32 of the desk 10.

The transporter 28 may include a hard disk drive 40. The disk drive 40 may be mounted to a separate printed circuit board 42 and connected to the top circuit board 38 by a flexible circuit board and corresponding connector (not shown).

The hard disk drive 40 and integrated circuit packages 34 may be enclosed by an outer protective housing 44. The housing 44 may include a pair of end plates 46 attached to a cover 48. The housing 44 may include one or more gaskets 50 located between the end plates 46 and the cover 48. The transporter 28 may also have an additional gasket 52 for the connector 38. The gaskets 50 and 52 can provide a seal that prevents fluid from entering the transporter 28. Additionally, the gaskets 50 can dampen a shock load applied to the transporter housing 44.

The transporter 28 may include a first heat sink 52 that is attached to an integrated circuit package 34. The package 34 may contain an integrated circuit that generates a relatively high amount of heat, such as a microprocessor. The transporter 28 may also have a second heat sink 54 that is attached to the cover 48 of the transporter housing 44. A conductive spring 56 may be located between the first 52 and second 54 heat sinks. The spring 56 may be a conductive elastomer material that can compensate for mechanical tolerances in the transporter assembly.

The transporter housing 44 may have a pair of outer grooves 58 that slide along corresponding rails (not shown) located within the slot 26 of the desk frame 12. The rails and grooves 58 provide bearings to guide the transporter 28 into and out of the slot 26.

FIG. 6 shows a transporter 28 being plugged into a backplane 60 of the desk 10. The backplane 60 may include a plurality of integrated circuit packages 62 mounted to a printed circuit board 64. The printed circuit board 64 is attached to the frame 12 of the desk 10. The backplane 60 has a connector 66 that mates with the connector 38 of the transporter 28. The backplane 60 may also have additional connectors 68 that can be coupled to the keyboard, screen and battery module of the desk 10.

The desk 10 may include a mechanical lock 70 that is mounted to the frame 12. The lock 70 can be actuated to secure the transporter 28 to the desk 10. By way of example, the lock 70 may be a solenoid actuated plunger 72 that moves into a corresponding slot 74 of the transporter housing 44. The plunger 72 can be moved out of the slot 74 to allow the transporter 28 to be pulled out of the desk 10.

Figure 7:
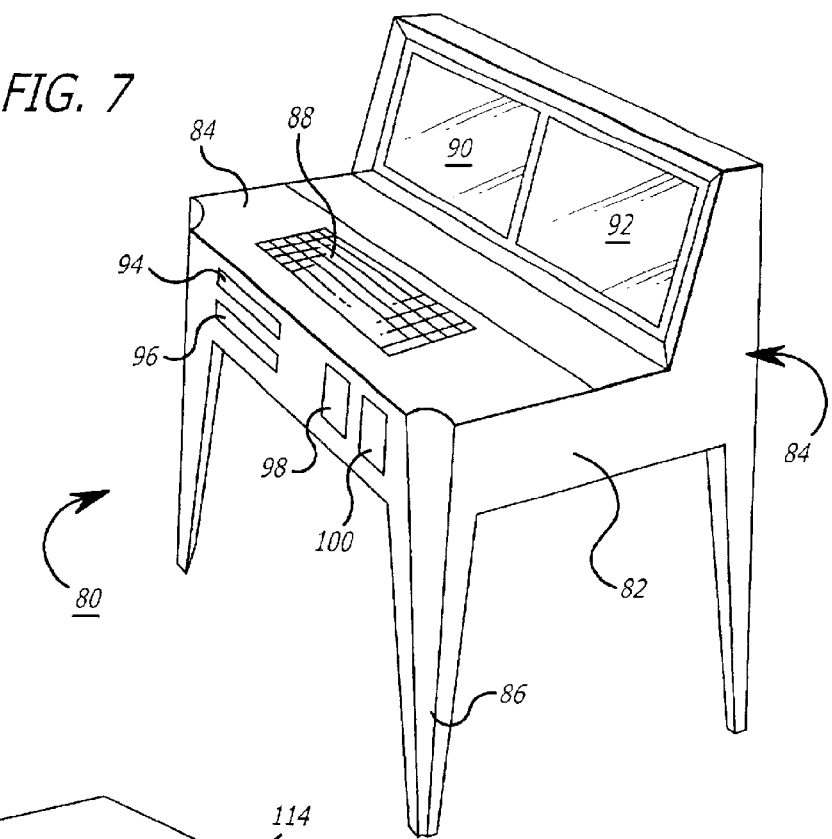
FIG. 7 is a perspective view of a teachers podium.

FIG. 7 shows an embodiment of a teachers podium 80. Like the desk 10 the podium 80 may include a frame 82 that has a table top 84 and a plurality of legs 86. The frame 82 may be constructed from a light, strong and relatively inexpensive molded plastic material.

A keyboard 88 may be attached to the table top 84. The podium 80 may include a first screen 90 and a separate second screen 92 that are attached to the frame 82. The teachers podium 80 may also include transporters 94 and 96, and battery modules 98 and 100. Transporter 94 and battery module 98 may be coupled to the first screen 90. Transporter 96 and battery module 100 may be coupled to the second screen 92.

The transporters 94 and 96 may be coupled to the desks 10 of a classroom so that a teacher operating the podium 80 can transmit and receive electronic information from the students. The separate screens 90 and 92, and transporters 94 and 96 allow the teacher to multi-task during a class session. For example, one transporter/screen may be used to provide classroom instructions to each student in the class. The other transporter/screen may be used to monitor a student(s). The podium 80 may be provided with collaborative software that allows the teacher to operate a students computer through the keyboard 88.

Figure 8:
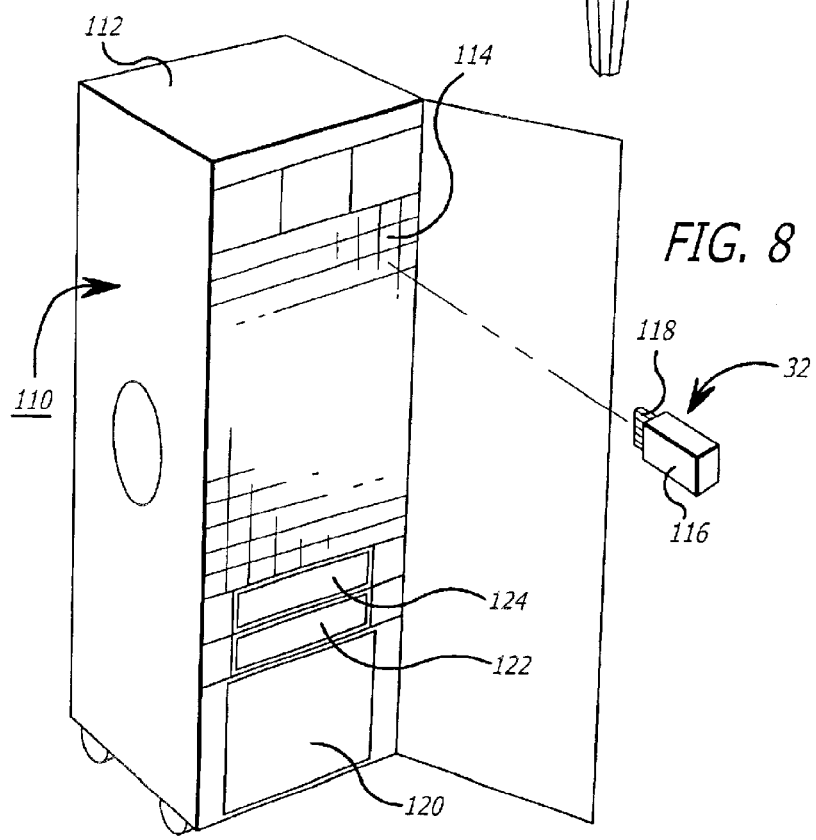
FIG. 8 is a perspective view of a charging station.

FIG. 8 shows a charging station 110 that can recharge the battery modules 32. The charging station 110 may include a cabinet 112 that has a plurality of slots 114. Each slot 114 may include an electrical connector (not shown) that is attached to an AC/DC converter and regulator that can recharge a DC battery. The battery module 32 may include a plurality of batteries (not shown) located within a module housing 116. The module 32 may also have an electrical connector 118 that can be plugged into a connector located in the slot 30 of the desk frame 12 or the connector located within the slot 114 of the charging station 110. At the end of each day the teacher and students may pull out their battery modules 32 and plug the modules 32 into the charging station 110 to recharge the batteries.

The charging station cabinet 112 may also house a server 120, a router 122 and a wireless transceiver 124 to interconnect the teachers and students with each other and other outside networks.

Figure 9:
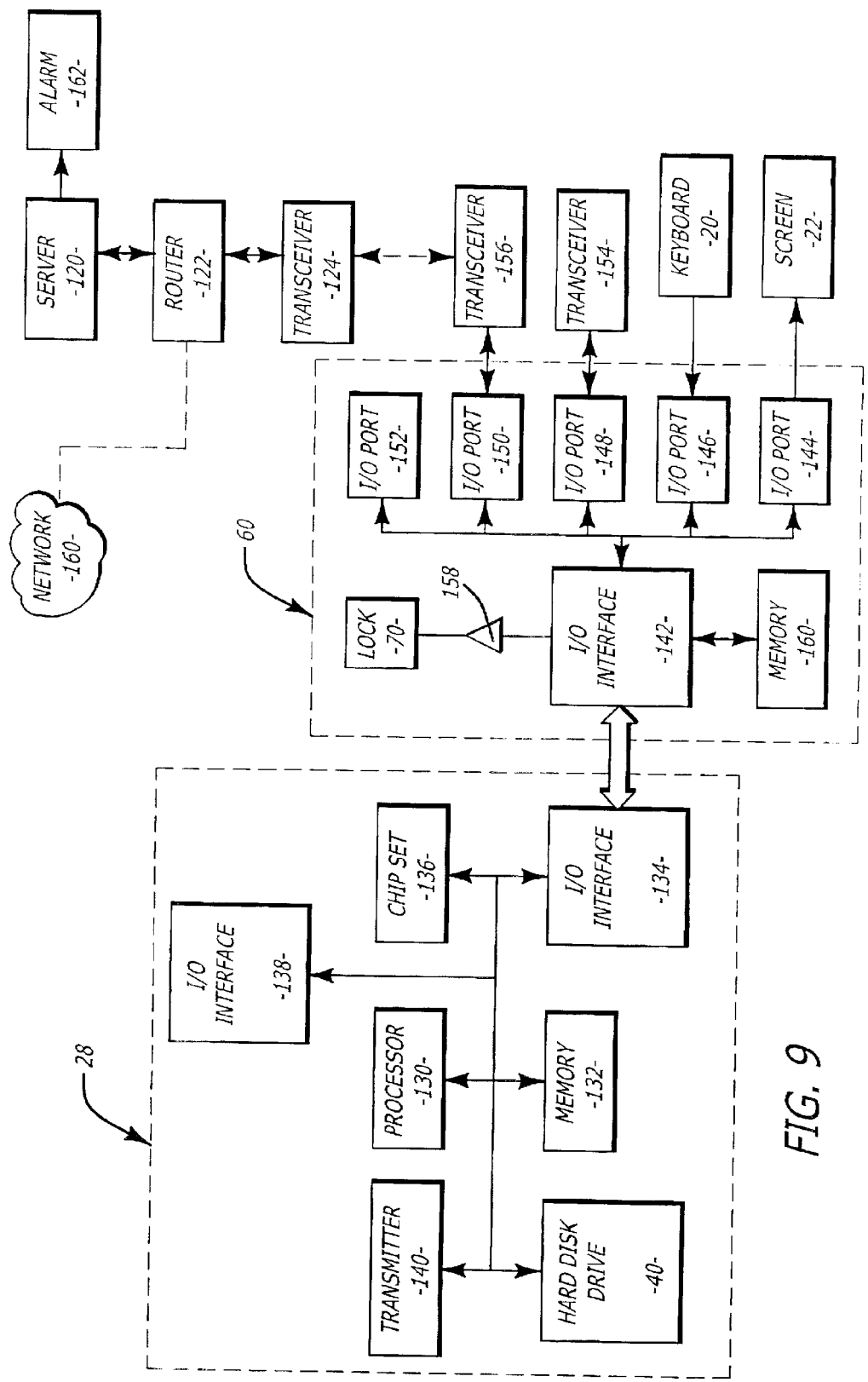
FIG. 9 is a schematic of a classroom set.

FIG. 9 shows a schematic of a transporter 28 and a backplane 60. The transporter 28 may include a microprocessor 130 that is coupled to one or more memory devices 132, an input/output (I/O) interface 134 and the hard disk drive 40. The memory devices 132 may include volatile and/or non-volatile memory such as dynamic random access memory (DRAM), static random access memory (SRAM) and read only memory (ROM).

The I/O interface 134 is connected to the connector 38 shown in FIG. 6. The microprocessor 130 may be connected to a graphics controller that is integrated with other functions such as bus management in an integrated circuit commonly referred to as a chip set 136. The microprocessor 130 may also be connected to a secondary I/O interface 138. The secondary I/O interface 138 can be coupled to an external device such as additional memory (not shown).

The transporter 10 may also have a transmitter 140 that can wirelessly transmit signals. By way of example, the transmitter 140 can transmit signals at radio frequency (RF). The transmitter 140 may be coupled to a non-volatile memory device that contains an RF id. If the transporter 28 is not properly shut down and detached from the backplane 60, the transmitter 140 may then automatically transmit the RF id on a continuous or periodic basis.

For example, the computer 28 may require a password or biometric entry to properly shut down and remove the transporter 28. If the password/biometric is not properly entered and the operator pulls the transporter 28 out of the backplane 12 the processor 130 may cause the transmitter 140 to emit the RF id. The transporter 28 would have a battery (not shown) to provide power to the transmitter 140.

The backplane 60 may have an I/O interface 142 that is connected to I/O ports 144, 146, 148, 150 and 152. Each I/O port 144, 146, 148, 150 and 152 is connected to a corresponding electrical connector. The I/O interface 142 is also connected to a connector (see item 66 in FIG. 6) that can be mated to the transporter 28.

The I/O ports 144, 146, 148, 150 and 152 can be connected to external devices that communicate with the backplane 60 using different signals and different protocols. The interface 142 may contain the protocols required to transmit information through the ports 144, 146, 148, 150 and 152. The ports 144, 146, 148, 150 and 152 may have circuits to drive the signals to interface with the physical layer of the external device.

By way of example, I/O port 144, may be connected to the screen 22. The I/O interface 142 and port 146 can be configured to transmit signals from the transporter 28 in accordance with signal levels and protocols required to drive the screen 22. The I/O interface 142 may include a hot plug firmware routine that determines the protocol, signals required to drive the screen 22 through a series of handshake signals transmitted between the devices 142 and 22.

I/O port 146 may be connected to the keyboard 20. The interface 142 and port 146 may be configured to provide protocols and signal levels which allow information to be transmitted from the keyboard 20 to the transporter 28.

I/O port 150 may be connected to a wireless transceiver 156. The wireless transceiver 156 is coupled to the wireless transceiver 124 coupled to the server 120. The wireless transceivers 124 and 156 may transmit signals with an RF carrier, optical medium or any other means for wireless transmission. The information can be transmitted in accordance with various wireless protocals.

I/O port 148 may be connected to a wireless transceiver 154 that is coupled to a telephone network (not shown). The telephone network may be a plain old telephone system (POTS), a public telephone network (PTN), Integrated Service Data Network (ISDN), Digital Subscriber Line (DSL) or another other phone service. The interface 142 and port 148 may transmit information in accordance with the signal levels, frequencies, protocols, etc. of the telephone network.

I/O port 152 may be an open port for additional devices. For example, port 152 may support USB protocol. The backplane 60 may have additional ports that support other post, present and future protocols and physical layer specifications. The I/O interface 142 may also be connected to the lock 70 by lock driver 158.

The backplane 60 may have a memory device 160 that is connected to the I/O interface 142. The memory device 160 may be non-volatile memory such as an EEPROM. The memory device 160 may include a backplane identification. The backplane identification is unique to the backplane 12 and each desk 10.

The backplane 60 of each desk 10 will have a different backplane identification. The backplane identification may be a series of alphanumeric characters. The backplane identification may also be encrypted.

The transporter 28 may store a unique client identification. The client identification may include personal information of the computer end user. The personal information may include a network address and telephone number for the computer. The client identification may be encrypted or otherwise encoded. The client identification may be stored in at least one hidden sector of the hard disk drive 40, to prevent unauthorized access to the client ID.

The server 120 and router 122 may also be connected to an external network 160, such as the Internet. The server 120 may also be connected to an alarm 162. The server 120, router 122 and wireless transceiver 124 may be coupled to the teachers podium 80 and all of the student desks 10 in a classroom. It being understood that the podium 80 has backplanes and transceivers coupled to the transporters 94 and 96.

The router 122 may route information to the podium 80 and desks 10 in accordance with a network address. By way of example, the network address may be an Internet Protocol (IP) address.

Figure 10:
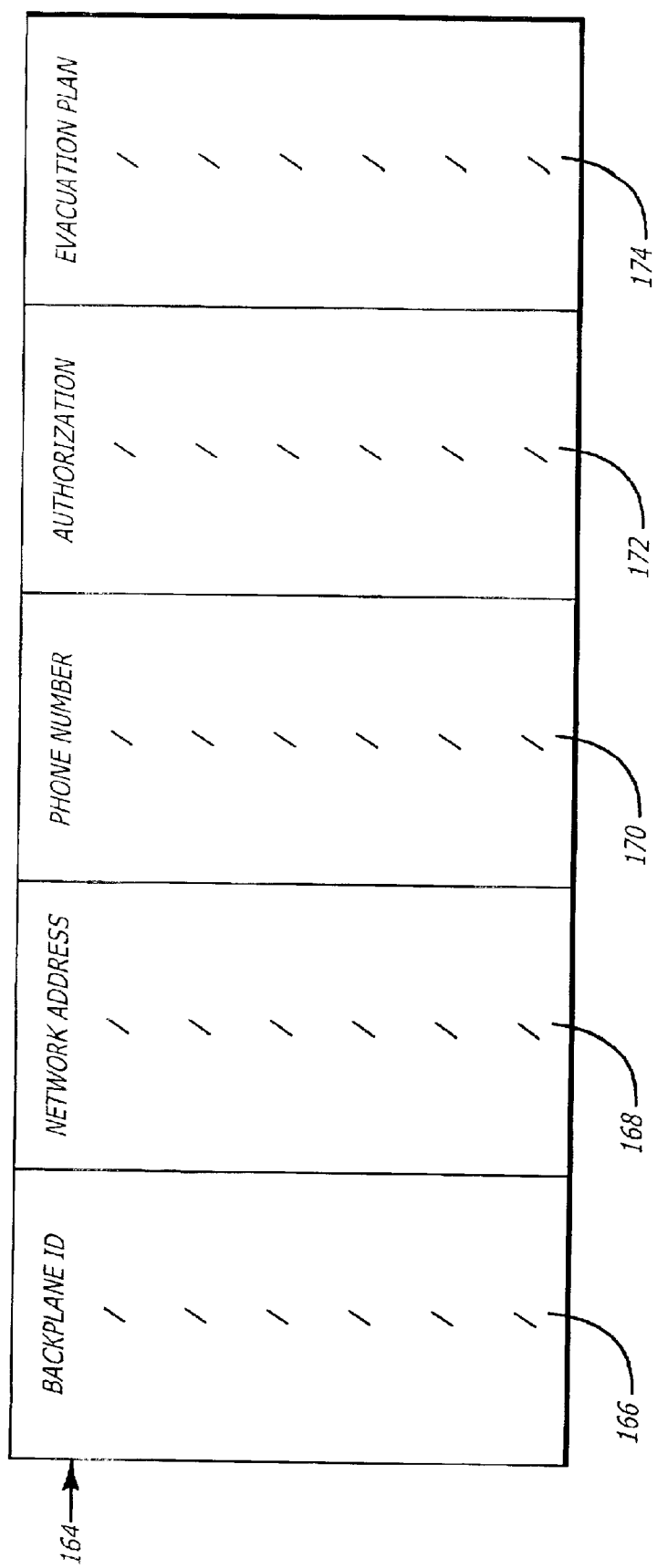
FIG. 10 is an illustration of a relational database.

As shown in FIG. 10, the server 120 may include a relational database 164. The database 164 may have a backplane identification field 166, a network address field 168, a phone number field 170, an authorization field 172 and an evacuation plan field 174. The database 164 correlates the backplane identification of each desk 10, with a network address, phone number (optional) and an evacuation plan.

The server 120 may operate in accordance with a software routine that accepts a command from the transporter 28 and re-configures the database 164 in accordance with the command. For example, the transporter 28 may transmit through the wireless transceivers a command that includes the client identification and an instruction to re-configure the database 164. The server 120 correlates the client identification with a specific network address and a phone number for the user's transporter. The server 120 may include a look-up table that associates the client identification with the network address and phone number. The server 120 can then vary the network relational database 164 to correlate the address and phone number of the client ID with the backplane and desk 10 that are mated with the transporter 28. Once the database 164 is re-configured all information associated with the address and phone number of the transporter 28 will be routed to the appropriate backplane. The computer ID automatically re-configures the network(s) by transmitting a command. There is no requirement to manually re-configure the system.

For example, a student may be sitting at a desk with a backplane ID at AAA and an network address of 0001. All network communications addressed to network address 0001 are routed to backplane AAA in accordance with the relational database 164. The student may then plug their transporter into a different desk that has a backplane with a backplane ID of BBB. The transporter reads the new backplane ID and provides a command for the server. The command is interpreted by the server to re-configure the relational database 164 and correlate the network address 0001 with the backplane ID BBB. All network communication for address 0001 to then routed to the desk with backplane BBB.

The server 120 may have a software routine that compares the client identification with an authorized client identification and activates the alarm 162 if the identifications do not match. The server 120 may also send a command to the backplane 60 to drive the lock 70 into a locked position so that the end user cannot unplug the transporter 28 from the backplane 60. The server 120 may also inhibit operation of the computer. For example, the server may send a command(s) to turn off the transporter 28, or prevent communication through the backplane 60.

The transmitter 140 may transmit the RF id if the transporter 28 is improperly detached from the backplane 60. The RF id signal may be received by the transceiver 124. The server 120 may have a software routine that drives the alarm 162 and records the alarm event when the transceiver 124 senses the RF id.

Figure 11:
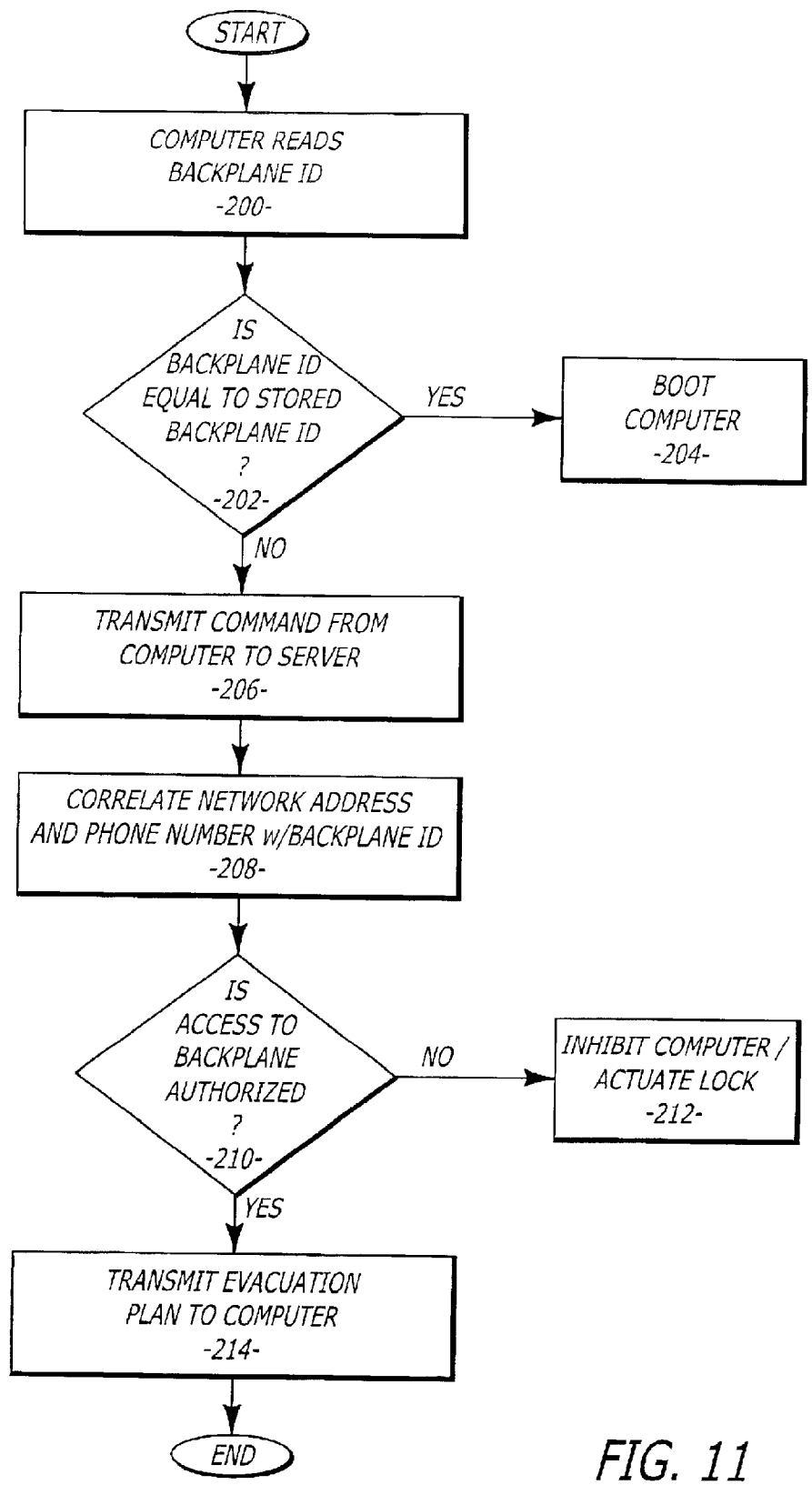
FIG. 11 is a flowchart showing an operation of the system.

The microprocessor 130 may operate in accordance with a software routine. The software routine may be performed in accordance with instructions and data stored within memory 132 and/or the hard disk drive 40. FIG. 11 describes an operation of the system by software routines performed by the transporter 28 and the server 120.

The end user initially plugs the transporter 28 into the backplane 60. The transporter 28 then reads the backplane identification from the memory device 160 in process block 200. The backplane ID can be read during an initialization routine of the transporter 28, wherein the processor 130 request data from the appropriate address(es) of the backplane memory 160. In decision block 202 the transporter compares the backplane identification transmitted from the backplane with a stored backplane identification. The stored backplane identification is the backplane ID for the backplane that was last coupled to the transporter 28. If the identifications match, a boot up routine is run so that the transporter 28 can be operated in process block 204. Matching IDs signify that the transporter 28 has not been moved to a different backplane.

If the identifications do not match, the computer transmits a command to the server 120 in block 206. The command may include the client identification. The client ID may be retrieved from the hidden sector(s) of the hard disk drive 40.

The command may be routed to the server 120 in accordance with a server network address entered into the computer through a configuration program. Alternatively, the server 120 may download the network address when the transporter 28 is plugged into the backplane 60. The backplane 60 may send a signal to prompt a download of the server network address when the connectors 38 and 66 are mated.

The server 120 re-configures the relational database to correlate the client identification information such as network address and phone number with the backplane identification in block 208. All information addressed to the network address and/or phone number will then be routed to the corresponding backplane associated with the client identification.

The server 120 may compare the client identification with an authorized client identification in decision block 210. If authorization is not granted the server 120 may transmit a command(s) to the backplane 60 to inhibit operation of the computer and/or engage the lock 70 in process block 212. If authorization is granted the server may then transmit an evacuation plan to the transporter in block 214. The evacuation plan may include diagrams, etc. that show the end user an evacuation route from the facility. The evacuation plan is unique to the backplane, such that the evacuation route is specifically directed to the physical location of the desk and the classroom. The transporter 28 can be booted subsequent to the transmission of the command in step 206.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A desk, comprising:

a frame;

a screen attached to said frame;

a keyboard attached to said frame;

a transporter computer plugged into said frame and coupled to said keyboard and said screen; and, a backplane that is attached to said frame and coupled to said transporter computer, wherein said backplane includes a backplane identification that is unique to said backplane.

2. The desk of claim 1, further comprising a battery module plugged into said frame and coupled to said transporter.

3. The desk of claim 1, wherein said screen is attached to a cover that can rotate relative onto a table top of said frame.

4. The desk of claim 1, wherein said frame includes a table top and a plurality of legs that are constructed from a molded plastic material.

5. The desk of claim 1, wherein said transporter computer retrieves said backplane identification and transmits a network re-configuration command.

6. The desk of claim 1, further comprising a wireless transceiver coupled to said transporter computer.

7. The desk of claim 1, wherein said transporter computer contains a wireless transmitter.

8. The desk of claim 1, further comprising a lock that secures said transporter computer to said frame.

9. A desk, comprising:

a frame;

a screen attached to said frame;

a keyboard attached to said frame;

transporter computer means for plugging into said frame and being coupled to said keyboard and said screen; and, backplane means for coupling said transporter computer means to said screen and said keyboard, wherein said backplane means includes a backplane identification that is unique to said backplane.

10. The desk of claim 9, further comprising battery module means for plugging into said frame and being coupled to said transporter computer means.

11. The desk of claim 9, wherein said screen is attached to a cover that can rotate relative onto a table top of said frame.

12. The desk of claim 9, wherein said frame includes a table top and a plurality of legs that are constructed from a molded plastic material.

13. The desk of claim 9, wherein said transporter computer means retrieves said backplane identification and transmits a network re-configuration command.

14. The desk of claim 9, further comprising a wireless transceiver coupled to said transporter computer means.

15. The desk of claim 9, wherein said transporter computer means contains a wireless transmitter.

16. The desk of claim 9, further comprising lock means for securing said transporter computer means to said frame.

* * * * *